(12) United States Patent
Shih et al.

(10) Patent No.: US 10,016,730 B2
(45) Date of Patent: Jul. 10, 2018

(54) DOPING OF INORGANIC MINERALS TO HYDROPHOBIC MEMBRANE SURFACE

(71) Applicant: THE UNIVERSITY OF HONG KONG, Hong Kong (HK)

(72) Inventors: Kaimin Shih, Hong Kong (HK);
Xiao-Yan Li, Hong Kong (HK);
Xiao-Mao Wang, Hong Kong (HK);
Tong Zhang, Hong Kong (HK)

(73) Assignee: THE UNIVERSITY OF HONG KONG, Hong Kong (HK)

( * ) Notice: Subject to any disclaimer, the term of this patent is extended or adjusted under 35 U.S.C. 154(b) by 263 days.

(21) Appl. No.: 14/934,329

(22) Filed: Nov. 6, 2015

(65) Prior Publication Data
US 2016/0129399 A1  May 12, 2016

Related U.S. Application Data

(62) Division of application No. 13/217,837, filed on Aug. 25, 2011, now Pat. No. 9,211,506.

(60) Provisional application No. 61/379,505, filed on Sep. 2, 2010.

(51) Int. Cl.
*B01D 67/00* (2006.01)
*B01D 69/14* (2006.01)

(52) U.S. Cl.
CPC ..... *B01D 67/0079* (2013.01); *B01D 67/0016* (2013.01); *B01D 67/0051* (2013.01); *B01D 69/148* (2013.01); *B01D 2323/21* (2013.01); *B01D 2323/22* (2013.01)

(58) Field of Classification Search
CPC ............ B01D 2323/21; B01D 2323/22; B01D 67/0016; B01D 67/0051; B01D 67/0079; B01D 69/148
See application file for complete search history.

(56) References Cited

U.S. PATENT DOCUMENTS

| | | | |
|---|---|---|---|
| 5,022,990 A | 6/1991 | Doi et al. | |
| 5,531,900 A | 7/1996 | Raghavan et al. | |
| 5,885,657 A | 3/1999 | Penth | |
| 6,316,684 B1 | 11/2001 | Pinnau et al. | |

(Continued)

FOREIGN PATENT DOCUMENTS

WO   WO 02/102500 A1 * 12/2002

OTHER PUBLICATIONS

Kim, et al. Design of TiO2 nanoparticle self-assembled aromatic polyamide thin-film-composite (TFC) membrane as an approach to solve biofouling problem, Elsevier journal of membrane science, 2003, pp. 157-165.

(Continued)

*Primary Examiner* — John Kim
(74) *Attorney, Agent, or Firm* — Amin, Turocy & Watson LLP

(57) ABSTRACT

Disclosed is a membrane surface modification method. The method is applicable to a variety of hydrophobic membranes by doping selected inorganic particles. One act of the method involves the in-situ embedment of the inorganic particles onto the membrane surface by dispersing the particles in a non-solvent bath for polymer precipitation. Further membrane surface modification can be achieved by hydrothermally growing new inorganic phase on the embedded particles. The embedment of particles is for the subsequent phase growth.

9 Claims, 5 Drawing Sheets

(56) References Cited

U.S. PATENT DOCUMENTS

| | | |
|---|---|---|
| 6,841,075 B2 | 1/2005 | Penth et al. |
| 6,890,436 B2 | 5/2005 | Komatsu et al. |
| 7,226,541 B2 | 6/2007 | Muller et al. |
| 7,717,271 B2 | 5/2010 | Ramaswamy et al. |
| 2009/0000475 A1 | 1/2009 | Fekety et al. |

OTHER PUBLICATIONS

Kwak, et al. Hybrid Organic/Inorganic Reverse Osmosis (RO) Membrane for Bacterial Anti-Fouling. 1. Preparation and Characterization of TlO2 Nanoparticle Self-Assembled Aromatic Polyamide Thin-Film-Composite (TFC) Membrane, Environmental Science and Technology, vol. 35, No. 11, 2001, pp. 2388-2394.

Luo, et al. Hydrophilic modification of poly(ether sulfone) ultrafiltration membrane surface by self-assembly of TiO2 nanoparticles, Elsevier applied surface science, 2005, pp. 76-84.

Maximous, et al. Preparation, characterization and performance of Al2o3/PES membrane for wastewater filtration, Elsevier Journal of Membrane Science, 2009, pp. 67-75.

Yan, et al. Effect of nano-sized Al2O3-particle addition on PVDF ultrafiltration membrane performance, Elsevier journal of membrane science, 2006, pp. 162-167.

Yang, et al. Preparation and characterizations of a new PS/TlO2 hybrid membranes by sol-gel process, Elsevier polymer science direct, 2006, pp. 2683-2688.

\* cited by examiner

| Membrane | Contact angle (°) | Remarks |
|---|---|---|
| Mem-1 | 94 | Nascent membrane |
| Mem-2 | 77 | γ-Al$_2$O$_3$ embedded on Mem-1 |
| Mem-3 | 50 | Gibbsite formed on Mem-2 |

DOPING OF INORGANIC MINERALS TO HYDROPHOBIC MEMBRANE SURFACE

CROSS-REFERENCE TO RELATED APPLICATIONS

This application is a Division of application Ser. No. 13/217,837, filed on Aug. 25, 2011, which claims priority to Provisional application Ser. No. 61/379,505, filed on Sep. 2, 2010, both of which are incorporated herein by reference.

TECHNICAL FIELD

Disclosed are surface modification techniques involving doping of inorganic minerals into polymeric membranes and related uses for water and wastewater treatment.

BACKGROUND

Filtration techniques utilizing filtering membranes having a permselectivity have made remarkable progress. Filtering membranes are currently utilized in practice in numerous applications including, for example, production of ultrapure water, preparation of medicines, sterilization and finalization of brewages and purification of drinking water. The use of filtering membranes is particularly valuable in meeting the requirement to refine water (a high degree treatment). Furthermore, the quality of surface water and groundwater is getting progressively worse as a result of pollution by wastewater and, it is increasingly recognized as an important way to guarantee the safe use of water.

Membrane filtration has a number of applications in water and wastewater treatment. Most membranes are fabricated from organic polymers which are hydrophobic in nature. Hydrophobic membranes have high tendency to be fouled by organic foulants deposition and/or biofilm formation.

Increasing the surface hydrophilicity is often attempted. This is typically realized by the coating of hydrophilic polymer layers, chemical or plasma treatment, graft polymerization, blending of hydrophilic polymer or amphiphilic copolymer or doping of inorganic materials. Doping of inorganic materials is beneficial due to the completely hydrophilic characteristic of inorganic materials, as well as the certain functionality to achieve membrane property modification and/or fouling reduction. However, the inorganic materials on/in the membranes modified by current available doping approaches are either not stable on the membrane surface or do not appear on the membrane surface.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

Described herein generally include surface modifications of polymeric membranes. More particularly, the doping of inorganic minerals, which includes embedment of inorganic particles and, in some instances, the growth of inorganic minerals on the embedded particles, to the surface of hydrophobic membranes is described herein. In other words, a method has been developed by which the inorganic materials can be stably embedded into a polymer matrix and be functional in the desired application. Furthermore, membrane hydrophilicity and other properties can be controlled through the selection and amount of doped materials. The need of surface modification of hydrophobic polymeric membranes by doping inorganic materials is thereby successfully satisfied.

In one embodiment, the in-situ embedment of inorganic particles, which are dispersed in a non-solvent bath, onto the membrane surface during the polymer precipitation and solidification. In another embodiment, an optional process additionally involves the subsequent growth of new inorganic minerals onto the embedded particles.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
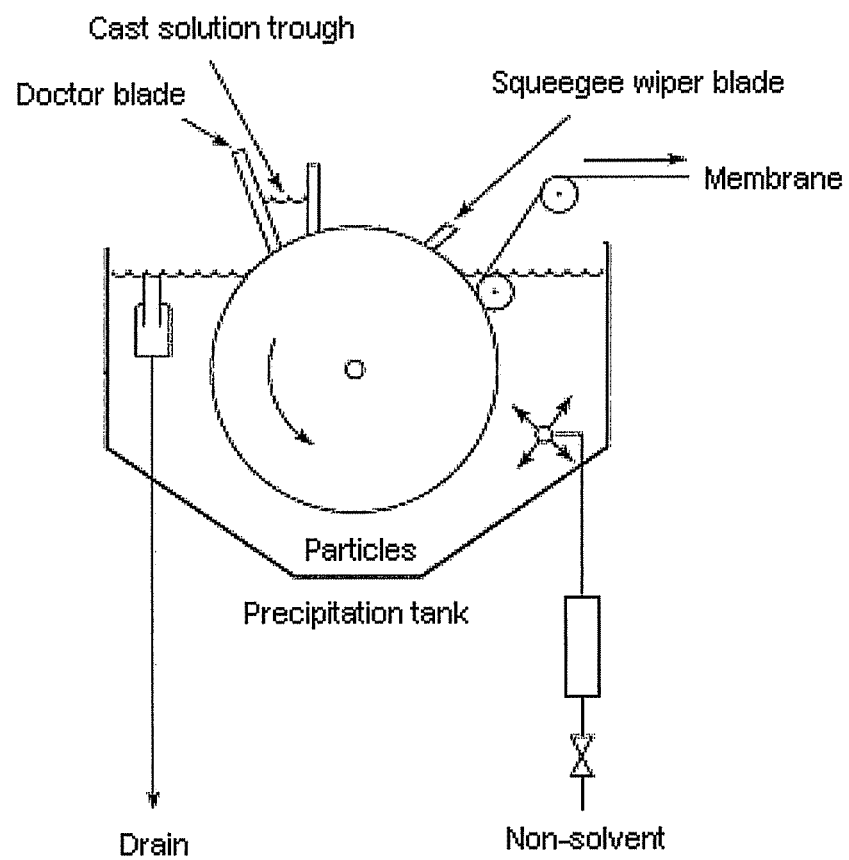
FIG. 1 depicts a schematic illustration of the device for fabricating membranes by the wet phase separation technique, together with the "in-situ" surface embedment of inorganic particles. The inorganic particles are dispersed in the non-solvent (e.g. water) phase during the polymerization process.

The methods of surface modification of polymeric membranes involve doping of inorganic minerals by in-situ embedment of inorganic particles during polymeric membrane solidification. Generally speaking, wet phase separation membrane formation process is employed to make the embedded polymeric membranes. A wet phase separation membrane formation process involves precipitating a dissolved polymer by immersion in a non-solvent bath to form a membrane structure. That is, the process involves the immersion of the cast solution of the polymers into a bath of non-solvent for the polymer precipitation and solidification.

The embedded polymeric membrane is made of any polymer that can be used in a wet phase separation membrane formation process. Examples of polymers include one or more of polyvinylidene fluorides (PVDF), polysulfones (PS), polyethersulfones (PES), polyacrylonitriles (PAN), polyimides, and polyvinyl chlorides (PVC), polyphenylsulfones (PPES), cellulose nitrate, and cellulose acetate, and copolymers and terpolymers thereof.

A number of inorganic particles can be used for the embedment. Suitable inorganic particles impart or increase the hydrophilicity of the polymer membrane while occupying surface positions on the polymer membrane. Examples of inorganic particles include aluminum oxides, aluminum hydroxides, titanium dioxide, and silver particles. Specific examples of alumina include gamma-alumina, eta-alumina, theta-alumina, and the like.

In one embodiment, the inorganic particles have an average particle size from 5 nm to 500 nm. In another embodiment, the inorganic particles have an average particle size from 10 nm to 250 nm. In yet another embodiment, the inorganic particles have an average particle size from 20 nm to 100 nm.

Requirements of this in-situ particle embedment approach are straightforward. Firstly, the particles are well dispersed in the non-solvent (e.g., water) bath, which can be easily attained by sufficiently reducing the particle size of dopants using conventional techniques. Secondly, the optimization of embedding particles to a specific membrane can be predicted by calculating the change of interfacial energy for the attachment of particles on the target membrane.

As described herein, the term "cast solution" refers to a polymer solution in which the polymer is well dissolved in a suitable solvent. The cast solution can also contain a suitable amount of a non-solvent, additive, and/or co-polymer. The term "non-solvent" refers to as a liquid or mixed liquid in which the polymer coagulates and/or precipitates.

Examples of solvents include one or more of N-methyl-2-pyrrolidone, dimethylformamide, dimethylacetamide, and the like. Examples of non-solvent, additive, and/or co-polymer include one or more of aliphatic polyhydric alcohols such as diethylene glycol, polyethylene glycol or glycerol; lower aliphatic alcohols such as methanol, ethanol or isopropyl alcohol; lower aliphatic ketones such as methyl ethyl ketone; water; and polyvinylpyrrolidone.

In one embodiment, the cast solution contains from 5% to 40% of polymer, from 10% to 90% of solvent, and from 1% to 40% of poor solvent, non-solvent, additive, and/or co-polymer. In another embodiment, the cast solution contains from 10% to 30% of polymer, from 20% to 80% of solvent, and from 2% to 30% of poor solvent, non-solvent, additive, and/or co-polymer.

Two specific examples of cast solutions were prepared as follows. Cast solution A comprises 18% PVDF (by weight), 3% glycerol (as poor solvent) and 79% N-Methyl-2-pyrrolidone (as the solvent for PVDF). Cast solution B is identical to cast solution A except that it contains 10% (by weight of PVDF) of polyvinylpyrrolidone (as additive). The non-solvent for PVDF precipitation was water, and the temperature of water can be increased above room temperature for increased membrane structure control.

The polymer membrane can be fabricated by the wet phase separation technique, by using the device as shown in FIG. 1. Both ultrafiltration and microfiltration membranes can be fabricated by this technique. The polymeric membranes are for microfiltration, for ultrafiltration, or for the supporting membranes of nanofiltration or of reverse/forward osmosis. The polymeric membranes can have either isotropic or anisotropic structure.

Figure 2A:
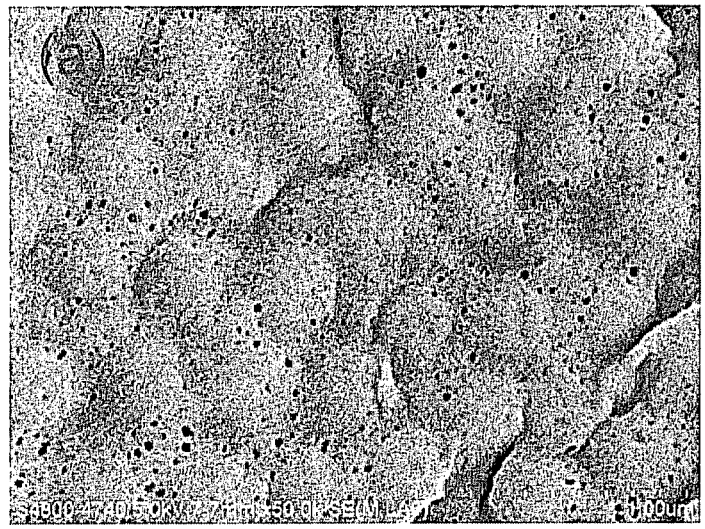
FIGS. 2(a) and 2(b) are pictures of top surfaces of (a) the ultrafiltration and (b) the microfiltration polyvinylidene fluoride (PVDF) membranes fabricated by the wet phase separation technique without particle doping.
Figure 2B:
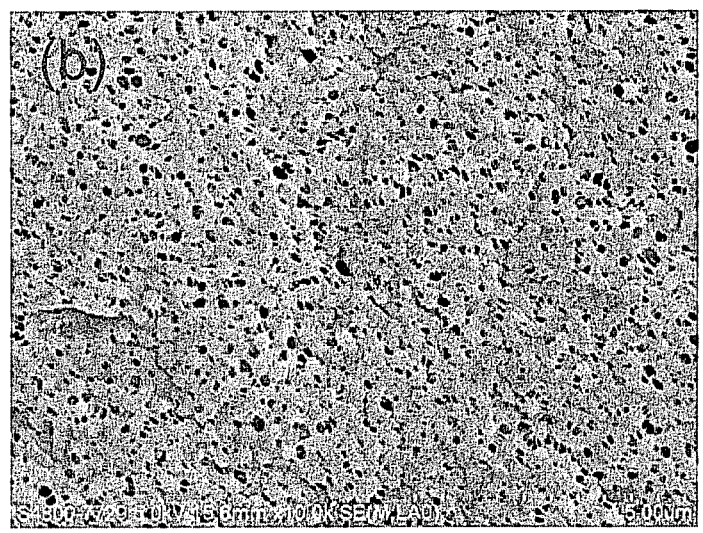
Figure 3A:
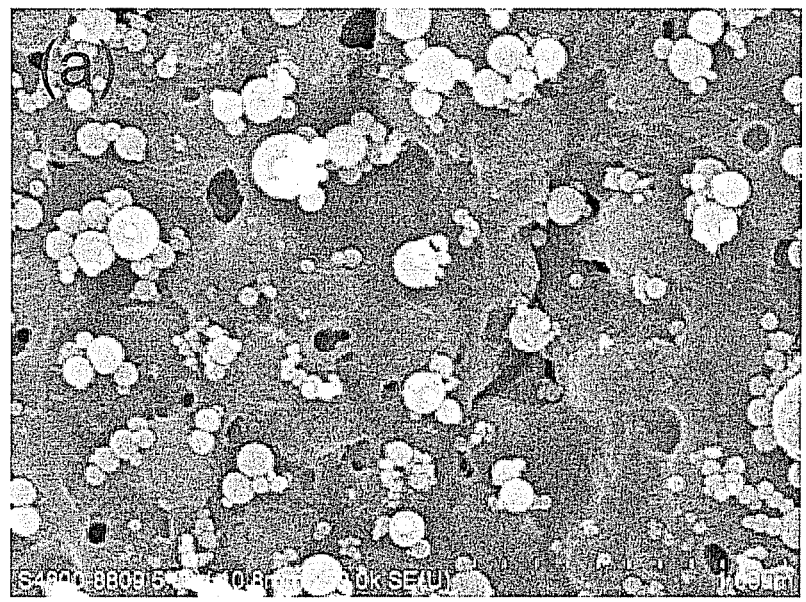
FIGS. 3(a) and 3(b) are pictures of top surfaces of a gamma-alumina-embedded PVDF membrane showing (a) the particle-modified surface and (b) the details of the anchored particles.
Figure 3B:
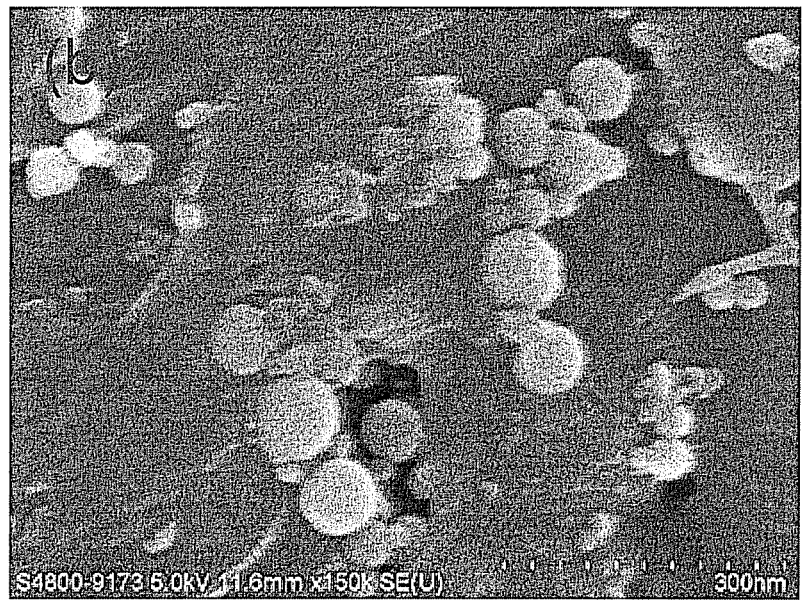

The product examples are demonstrated in FIG. 2, with the ultrafiltration membrane fabricated using cast solution A in a water (non-solvent) bath at room temperature and the microfiltration membrane fabricated using cast solution B in a water (non-solvent) bath at 90° C. The in-situ particle embedment technique involved in the invention makes slight modification to the classical wet phase separation technique by dispersing the inorganic particle dopants in the non-solvent bath. In our demonstration, nano-sized (average diameter of 40 nm) gamma-alumina particles were dispersed in the water bath at a concentration of 0.15 g/L. The particles were embedded onto the PVDF membrane surface during the polymer precipitation and solidification (membrane formation) processes. The distribution of particles on the membrane is uniform (FIG. 3a) and the particles are tightly anchored into the PVDF matrix (FIG. 3b). This in-situ particle embedment technique is simple and easy to be adopted by current membrane fabrication facilities.

The invention extends to the growth of new inorganic phases on the embedded particles. Generally, the growth of new inorganic phases on the embedded particles is conducted under elevated temperatures in an aqueous solution of inorganic materials. In other words, additional growth of other anhydrous or hydrated minerals such as aluminum oxides can be accomplished.

In one embodiment, the growth of new inorganic phases is carried out in an aqueous solution at a temperature from 30° C. to 150° C. In another embodiment, the growth of new inorganic phases is carried out in an aqueous solution at a temperature from 40° C. to 100° C. In yet another embodiment, the growth of new inorganic phases is carried out in an aqueous solution at a temperature from 40° C. to 100° C. Examples of the inorganic materials are the same as or derivates (such as (hydr)oxides of aluminum, oxides of titanium, and metal silver) of the inorganic particles described above.

Figure 4A:
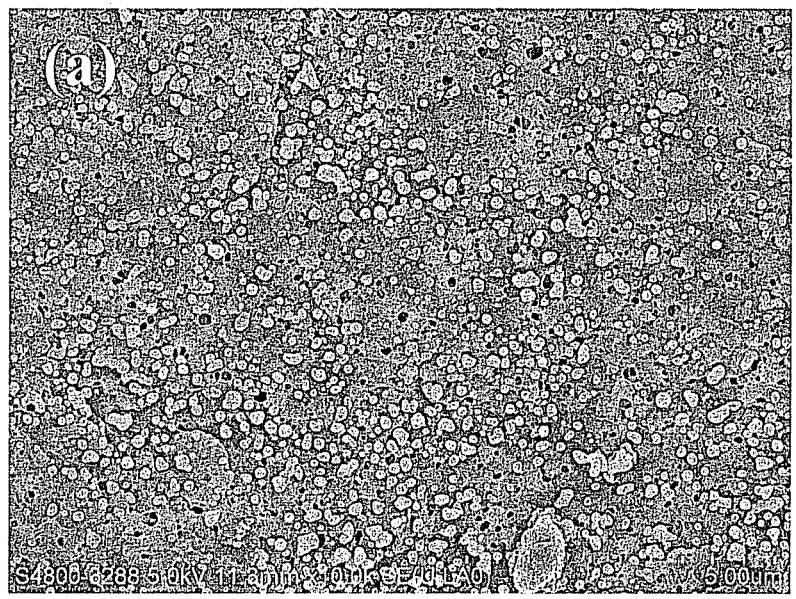
FIGS. 4(a) and 4(b) are pictures demonstrating the gibbsite growth on the gamma-alumina-embedded surface. The result was achieved by hydrothermally (105° C.) treating the base membranes in a 3 mM aluminum sulfate solution for (a) 8 hours and (b) 2 days.
Figure 4B:
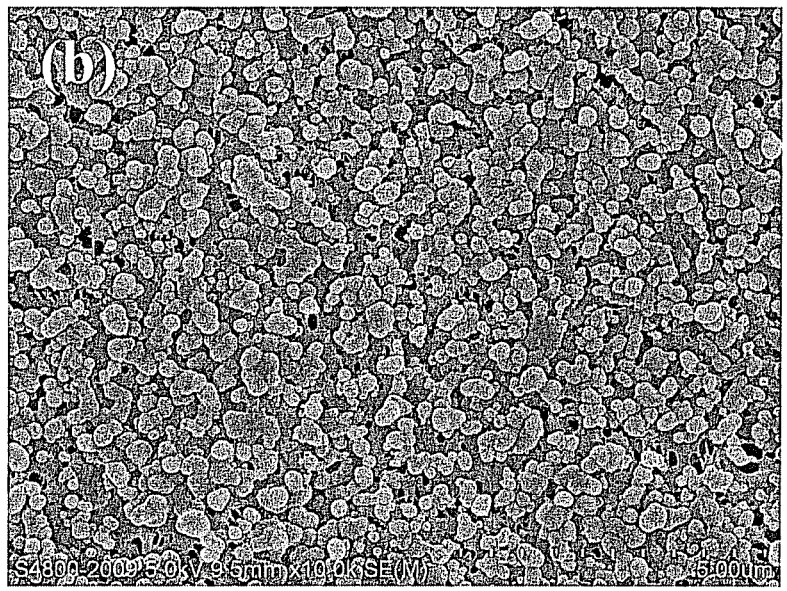

An example is shown by the growth of gibbsite (gamma-$Al(OH)_3$) on the embedded gamma-alumina particles by hydrothermally treating the membrane in a 3 mM $Al_2(SO_4)_3$ solution at 105° C. (FIG. 4). The coverage ratio of the grown phase can be easily controlled by, but not limited to, the duration of the hydrothermal treatment. No inorganic substance was found to stably grow on the bare membrane (without precedent particle embedment), which beneficially prevents the blockage of the membrane pores and reveals the necessity of embedding the "root" particles on the membrane. The process of growing inorganic phases to further modify the membrane surface property is optional but provides the flexibility of creating the surface-root composite structure, based on the different particle materials anchored on the membrane surface.

The resultant embedded polymeric membranes contain embedded inorganic particles, polymer, and optionally grown inorganic material (if the hydrothermal growth technique is exercised). In one embodiment, the resultant embedded polymeric membranes on the surface contains from 2% to 70% of inorganic particles, from 30% to 98% of polymer, and from 0% to 70% grown inorganic material. In another embodiment, the resultant embedded polymeric membranes contains on the surface from 5% to 60% of inorganic particles, from 40% to 95% of polymer, and from 0% to 60% grown inorganic material.

Regardless of the precise manner in which inorganic particles are embedded in the surface of polymeric membranes, the term "surface" in this context means to a depth of 0.5 microns or less. That is, the term surface is from the superficial or outermost boundary of the polymeric membranes to a depth of 0.5 microns or less. In some instances, surface includes to a depth of 0.25 microns or less. In other instances, surface includes to a depth of 0.1 microns or less. In still other instances, surface includes only the exposed outermost boundary of the polymeric membranes (what is present on the superficial surface).

The increase of hydrophilicity of resultant embedded polymeric membranes is attributable to inorganic particles on the surface of the polymer. In one embodiment, at least 25% area of the surface of the resultant embedded polymeric membranes is the inorganic particles. In another embodiment, at least 50% area of the surface of the resultant embedded polymeric membranes is the inorganic particles. In yet another embodiment, at least 60% area of the surface of the resultant embedded polymeric membranes is the inorganic particles.

The increase of hydrophilicity is apparent after the particle embedment and the subsequent inorganic phase growth. In one embodiment, the resultant embedded polymeric membrane has contact angle of 80° or less. In another embodiment, hydrophilic surfaces have contact angles of 70° or less. In yet another embodiment, hydrophilic surfaces have contact angles of 60° or less.

Figures 5, 6:
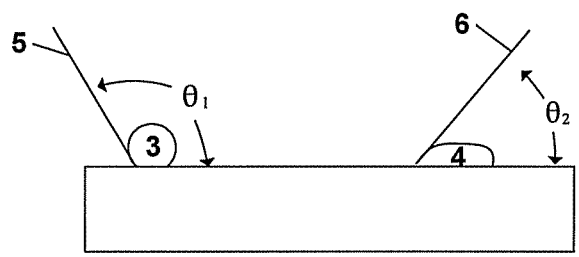
FIG. 5 illustrates a Table describing the enhanced membrane surface hydrophilicity due to gamma-alumina particle embedment and the subsequent gibbsite growth.
FIG. 6 depicts a schematic illustration of the hydrophilic surface's contact angles.

Hydrophilicity refers to the physical property of a surface to like or attach water. Hydrophilicity can be described in more quantitative terms by using contact angle measurements. Referring to FIG. 6, the contact angle 9 is defined by the equilibrium forces that occur when a liquid sessile drop 3, 4 is placed on a smooth surface 2. The tangent 5, 6 to the surface 2 of the convex liquid drop 3, 4 at the point of contact among the three phases (solid, liquid, and vapor) is the contact angle $\theta_1$, $\theta_2$ as illustrated in FIG. 6. Young's equation, $\gamma_{SL} = \gamma_S - \gamma_L \cos \theta$ defines the relationship between the surface tension of the solid-vapor ($\gamma_S$, vector along surface 2 away from center of drop 3, 4), solid-liquid ($\gamma_{SL}$, vector along surface 2 toward center of drop 3, 4), and liquid-vapor ($\delta_L$, tangent 5, 6).

For purposes of this invention, hydrophilic surfaces have contact angles of about 90° or less. In another embodiment, hydrophilic surfaces have contact angles of increasing the hydrophilicity means decreasing the contact angle, even if the decreased contact angle is more than 90°, for example, a decreased contact angle from 120° to 95°.

Comparing the resultant embedded polymeric membranes with similar polymeric membranes but not containing the embedded inorganic particles, the resultant embedded polymeric membranes have a contact angle at least 10° less than the contact angle of the similar polymeric membranes but not containing the embedded inorganic particles. In another embodiment, the resultant embedded polymeric membranes have a contact angle at least 15° less than the contact angle of the similar polymeric membranes but not containing the embedded inorganic particles.

An example is shown in the table of FIG. 5. The nascent membrane is quite hydrophobic with a water droplet contact angle of 94°. With the particle embedment, the contact angle is reduced to 77°. Further contact angle decrease to 50° is observed with gibbsite growth.

The invention is not limited to only increasing the membrane hydrophilicty. For example, nano silver particles are found to have bactericidal function and as such are beneficial for biofilm formation control. Nano silver particles can be embedded onto the surface of a number of membranes by dispersing the particles in the non-solvent bath for the polymer of this invented technique. Another example is the employment of this invention to embed titanium dioxide particles on a suitable membrane surface. As a type of photocatalysts, the embedded titanium dioxide will undergo photocatalytic reaction to achieve the pollutant degradation or detoxification under the irradiation of UV or sun light. Therefore, this invention is also providing a fabrication method for photocatalytically active membranes.

The embedded polymeric membranes have reduced fouling rates compared to polymeric membranes not containing the embedded inorganic particles. For example, using calcium alginate in a feed solution shows that the doping of either gamma-alumina or gibbsite in PVDF membrane reduces the rate of formation of an undesirable gel layer on membrane surface. The addition of inorganic materials in embedding polymeric membranes leads to increased membrane permeability and improved control of membrane-surface properties. Therefore, a hydrophilic, less fouled and preferred property of polymeric membrane surface can be achieved to allow the use of water membrane treatment technology for bioreactors and high solid-content feed water. The embedded polymeric membranes have usefulness in treating water having high organic solids, such as industrial waste streams, bioreactors, sewage, and landfill leachate.

Unless otherwise indicated in the specification and claims, all parts and percentages are by weight, all temperatures are in degrees Centigrade, and pressure is at or near atmospheric pressure.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, etc., used in the specification and claims are to be understood as modified in all instances by the term "about."

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of surface modification to polymeric membranes by doping of inorganic minerals; wherein the doping comprises the in-situ embedment of inorganic particles dispersed in a non-solvent bath during membrane solidification.

2. The surface modification method of claim 1, wherein the inorganic particles comprise one or more selected from the group consisting of: aluminum oxides, aluminum hydroxides, titanium dioxide, and silver particles.

3. The surface modification method of claim 1, wherein the polymeric membranes that are fabricated through a phase separation technique from one or more selected from the group consisting of: polyvinylidene fluorides, polysulfones, polyethersulfones, polyacrylonitriles, polyimides, and polyvinyl chlorides, polyphenylsulfones, cellulose nitrate, and cellulose acetate, and copolymers and terpolymers thereof.

4. The surface modification method in claim 3 involves the immersion of the cast solution of the polymers into a bath of non-solvent for the polymer precipitation and solidification.

5. The surface modification method of claim 3, wherein the polymeric membranes are for microfiltration, for ultrafiltration, or for the supporting membranes of nanofiltration or of reverse/forward osmosis.

6. The surface modification method of claim 3, wherein the polymeric membranes have either isotropic structure or anisotropic structure.

7. The surface modification method of claim 1 involves the dispersion of the inorganic particles in a non-solvent for the polymeric materials of the membrane.

8. The surface modification method of claim 1, wherein the inorganic particles have an average particle size from 5 nm to 500 nm.

9. The surface modification method of claim 1, wherein the cast solution comprises from 5% to 40% of polymer, from 10% to 90% of solvent, and from 1% to 40% of non-solvent, additive, and/or co-polymer.

* * * * *